July 31, 1956     C. C. STEPHENS     2,757,325
ELECTRIC MOTOR CONTROL SYSTEM FOR TENSIONING MATERIAL
Filed March 17, 1954
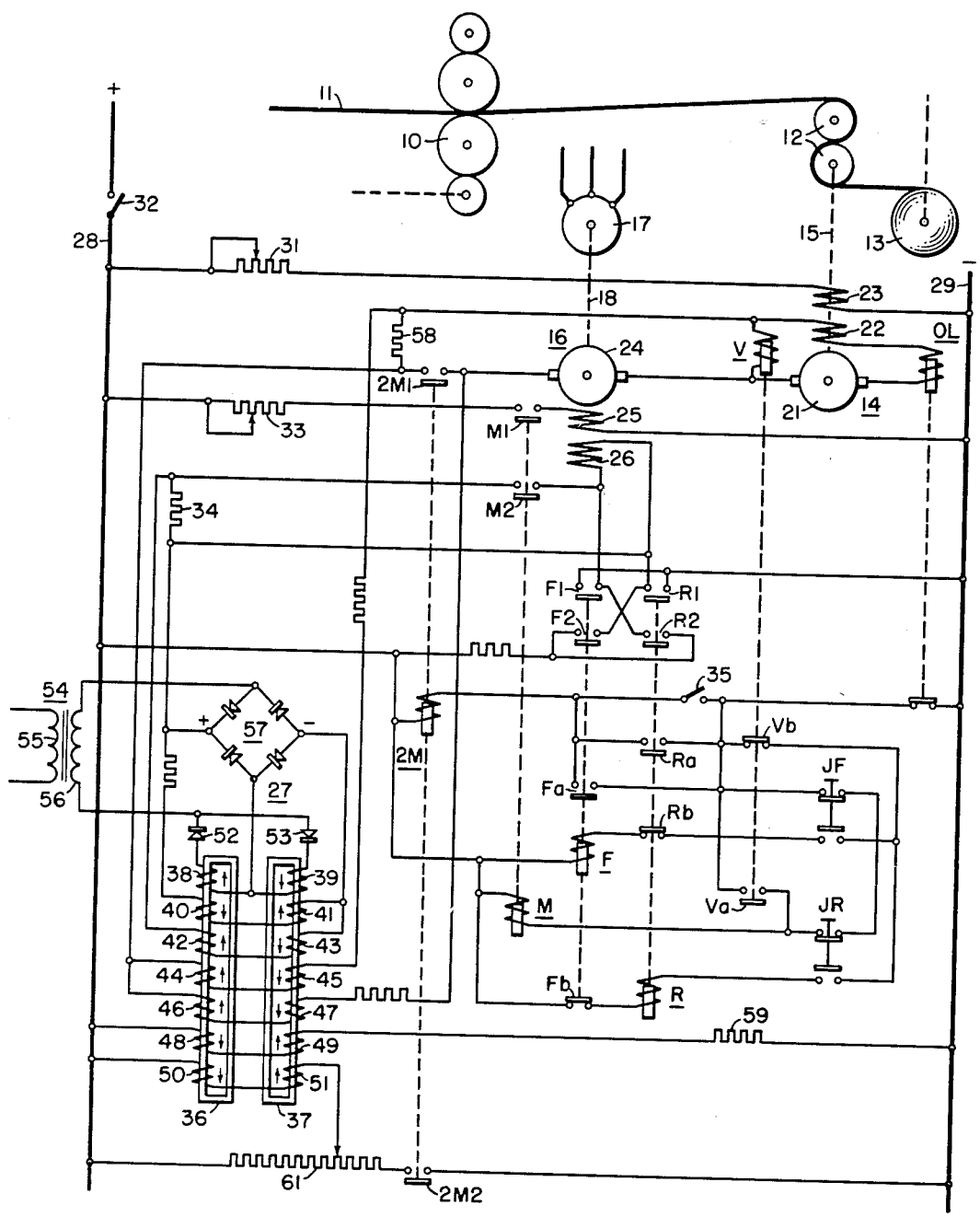
WITNESSES
INVENTOR
Claude C. Stephens.
BY
ATTORNEY

United States Patent Office 2,757,325
Patented July 31, 1956

2,757,325

ELECTRIC MOTOR CONTROL SYSTEM FOR TENSIONING MATERIAL

Claude C. Stephens, Snyder, N. Y., assignor to Westinghouse Electric Corporation, East Pittsburgh, Pa., a corporation of Pennsylvania Application March 17, 1954, Serial No. 416,830

12 Claims. (Cl. 318—6)

My invention relates generally to voltage control systems and, more particularly, to systems for controlling the voltage of dynamoelectric machines which are normally connected in a closed loop circuit.

When rolling steel, or other strip material, tension devices are usually provided to maintain tension against a mill or winding reel. Such a device may comprise a pair of tension rolls mechanically connected to a dynamoelectric machine which is electrically connected in a closed loop circuit with a second dynamoelectric machine driven by a substantially constant speed motor. Heretofore, it has been the general practice to initiate a stall tension with this device while brakes are set on the mill or reel. The rolling operation is then begun by accelerating from standstill and operation is satisfactory so long as tension is maintained.

If the machines are disconnected by opening the loop circuit, or tension is lost for any reason, the voltage of the machine connected to the tension rolls remains high, since this voltage depends on the speed of this machine, but the voltage of the other machine drops to zero because of the action of the regulator which controls the second machine. If the loop circuit is reclosed under these conditions a high and undesirable current surge would result. Heretofore, it has been the usual practice to stop the mill if the tension machines became disconnected, and provide a voltage relay to prevent the machines from being reconnected until the voltage of both machines was near zero. This also required that stall tension be applied before acceleration was begun, thereby necessitating a further delay in the rolling operations.

An object of my invention is to provide for automatically matching the voltages of a regulated machine and an unregulated machine which can be connected in a closed loop circuit.

Another object of my invention is to utilize the same regulator for controlling the operation of the machines when they are disconnected as when they are connected in the closed loop circuit.

A further object of my invention is to provide a voltage control system in which regulators of different types may be utilized.

A more general object of my invention is to provide a voltage control system which shall be simple and efficient in operation and which may be economically manufactured and installed.

Other objects of my invention will be explained fully hereinafter or will be apparent to those skilled in the art.

In accordance with one embodiment of my invention, a regulator which controls the operation of two electrically connected dynamoelectric machines, one of which is mechanically connected to the rolls of a tension device and the other of which is driven at a substantially constant speed, to maintain a predetermined tension on a strip of material passing through the device is utilized to match closely the voltages of the machines when the loop circuit which normally connects the machines is opened. Thus, the loop circuit can be closed without encountering the high current surge which would be caused if the loop circuit were closed while the voltages of the two machines are unequal.

For a better understanding of the nature and objects of the invention, reference may be had to the following detailed description, taken in conjunction with the accompanying drawing, in which the single figure is a diagrammatic view of a control system embodying the principal features of the invention.

Referring to the drawing, the system shown therein comprises a roll stand 10, suitable for rolling a strip of material 11, tension rolls 12, a winding reel 13, a dynamoelectric machine 14 connected to the tension rolls 12 through a shaft 15, a dynamoelectric machine 16 connected to an alternating current motor 17 through a shaft 18, a switch or magnetic contactor 2M for connecting the machines 14 and 16 in a closed loop circuit, a current-responsive overload relay OL having its actuating coil connected in the loop circuit and a voltage-responsive relay V having its actuating coil connected across the loop circuit. In accordance with the usual practice, the roll stand 10 may be driven by a suitable motor (not shown). The reel 13 may also be driven by a motor (not shown). In order to simplify the present drawing, other portions of the mill, such as an additional roll stand and an unwinding reel have not been illustrated, as their operation is well known in the art.

The dynamoelectric machine 14 has an armature winding 21, a series field winding 22 and a separately excited field winding 23. The machine 16 has an armature winding 24, a separately excited field winding 25 and a field winding 26, the excitation of which is normally controlled by a regulator 27. The winding 23 is connected across power conductors 28 and 29 through an adjustable resistor 31. The conductors 28 and 29 are energized from a suitable source of direct current power when a switch 32 is closed. The winding 25 is connected across the conductors 28 and 29 through an adjustable resistor 33 and contact members M1 of a switch or contactor M. The winding 26 is connected across a resistor 34 through contact members M2 of the switch M. The energization of the resistor 34 is controlled by the regulator 27, as will be explained more fully hereinafter.

The energization of the actuating coil of the switch a contactor 2M is normally controlled by a manually operable switch 35 which is closed to cause the tension device to apply tension on the reel 13. However, provision is made for jogging the tension device to feed the strip through the rolls to the reel 13 in which case the switch 35 is opened.

Push-button switches JF and JR are provided to control the jogging operation. The switch JF controls the energization of the actuating coil of a reversing switch F. The switch JR controls the energization of the actuating coil of a reversing switch R. The reversing switches F and R control the energization of the field winding 26 from the conductors 28 and 29 to secure the desired direction of jogging operations. The coil of the switch 2M is energized through either contact members Fa on the switch F or contact members Ra on the switch R to close the switch 2M during the jogging operation.

It will be noted that back contact members Vb on the voltage-responsive relay V must be closed during jogging. Interlocking contact members Fb and Rb are provided on the switches F and R, respectively, to prevent both of these switches from being closed at the same time. Contact members Va on the relay V prevent improper operation of the switches JF and JR from opening the field switch M during normal operation of the tension device. However, the switch M is open during jogging to deenergize the field winding 25. As explained hereinbefore, the field winding 26 is energized either through contact members F1 and F2 or R1 and R2 on the reversing switches F and R, respectively, during jogging.

As previously explained, the regulator 27 controls the energization of the field winding 26 during normal operation of the tension device. The regulator 27 illustrated is generally known as a magnetic amplifier. However, regulators of other types, such as rotating regulators or electronic regulators, may be utilized in practicing my invention.

The magnetic amplifier 27 comprises two magnetic core members 36 and 37 on which are disposed load windings 38 and 39, anti-hunt windings 40 and 41, self-energizing windings 42 and 43, current-responsive windings 44 and 45, voltage-responsive windings 46 and 47, bias windings 48 and 49, and pattern windings 50 and 51. In accordance with the usual practice, self-saturating rectifiers 52 and 53 are connected in series-circuit relation with the load windings 38 and 39, respectively.

The energy for the load windings 38 and 39 is obtained from a transformer 54 having a primary winding 55 and a secondary winding 56. The primary winding may be energized from any suitable source of alternating current power.

A full-wave rectifier 57 is interconnected with the load windings 38 and 39 and the secondary winding 56 to produce a direct current output from the magnetic amplifier. The resistor 34 is connected across the output terminals of the rectifier 57 in series-circuit relationship with the self-energizing windings 42 and 43. The anti-hunt windings 40 and 41 are also connected across the output terminals of the rectifier 57. As previously explained the field winding 26 is connected in parallel-circuit relation with the resistor 34 when contact members M2 of the switch M are closed. The resistor 34 functions as a minimum load resistor to permit magnetic amplifier exciting current to flow when the field winding 26 is disconnected.

The current-responsive windings 44 and 45 are connected across a resistor 58 which is connected in the loop circuit for the machines 14 and 16. Thus, the windings 44 and 45 are energized in accordance with the current in the loop circuit when contact members 2M1 of the switch 2M are closed.

The voltage-responsive windings 46 and 47 are connected across the contact members 2M1 of the switch 2M. Thus, the windings 46 and 47 are energized in accordance with the differential voltage across the contact members 2M1 when they open. The current-responsive windings 44 and 45 are deenergized when the contact members 2M1 are open since no current is flowing in the resistor 58. The voltage-responsive windings 46 and 47 are deenergized when the contact members 2M1 are closed since there is no voltage drop across the closed contact members except a slight resistance drop. Therefore, the magnetic amplifier 27 regulates for current when the loop circuit is closed and for voltage when the loop circuit is open.

The bias windings 48 and 49 are provided to obtain the desired characteristics of the magnetic amplifier. They are connected across the direct current conductors 28 and 29 in series with a resistor 59.

The pattern windings 50 and 51 are connected to a potentiometer resistor 61 which is connected across the conductors 28 and 29 when contact members 2M2 of the switch 2M are closed. The setting of the potentiometer 61 determines the energization of the windings 50 and 51 and hence the pattern or reference point of the regulator when it is functioning as a current regulator. The pattern windings are not energized when the voltage-responsive windings 46 and 47 are energized.

Under normal operating conditions when the switch 2M is closed the machine 14 is rotating by action of the moving strip 11 as it passes over and between the tension rolls 12. This produces a voltage which causes current to circulate in the closed loop circuit including the resistor 58. As previously explained, the current windings 44 and 45 of the magnetic amplifier are energized in accordance with this current. Accordingly, the output of the amplifier which controls the field excitation of the machine 16 is such that the voltage of the machine 16, which opposes the voltage of the machine 14, is of the proper magnitude to allow only the desired amount of current to flow in the loop circuit to maintain a tension on the strip as determined by the setting of the potentiometer 61 which controls the energization of the pattern windings 50 and 51.

If the loop circuit current tends to increase, the voltage of machine 16 increases to counteract the tendency of the current to increase. Thus, it will be seen that the voltage of machine 16 is below the voltage of machine 14 by an amount corresponding to the desired current regardless of the voltage of machine 14 which varies with its speed as it has constant field excitation. The voltage of machine 16 is determined by its field excitation since it operates at substantially constant speed.

If the switch 2M is opened for any reason, as by action of the overload relay OL or opening of the tension control switch 35, the loop circuit current becomes zero. With prior systems in attempting to regulate for constant current the voltage of machine 16 would drop to zero. With the present system opening the switch 2M causes the voltage windings 46 and 47 on the magnetic amplifier to be energized by the differential voltage across the contact members 2M1. The amplifier then regulates for zero voltage differential across contact members 2M1, that is, the voltages of the two machines are maintained substantially equal. If the voltage of machine 14 rises, current flows through windings 46 and 47 in a direction to increase the voltage of machine 16. If the voltage of machine 14 drops, current flows through windings 46 and 47 in a direction to decrease the voltage of machine 16.

Under the foregoing conditions, the switch 2M can be reclosed at any time without encountering a high surge current since the voltage across the contact members of the switch to be closed is substantially zero. With prior systems it was necessary to stop the machine 14 before the switch 2M could be reclosed without causing a high surge current. With the present system the switch 2M can be reclosed at any time and the current rises to the desired value under the control of the regulator without any initial surge. Therefore, considerable time can be saved after a jogging operation or after the opening of the tension control switch for any reason.

From the foregoing description, it is apparent that I have provided a voltage control system which has definite advantages over prior systems for controlling the operation of dynamoelectric machines which operate in a closed loop circuit in connection with tension devices or other installations in which both machines may continues to rotate after the loop circuit is opened. The present system is relatively simple and requires only a small amount of additional equipment over the amount required for prior systems.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, and regulating means including means responsive to the current in said closed circuit for controlling the field excitation of said second machine when said switching means is closed, said regulating means including means responsive to the differential voltage across the contact members of said switching means for controlling the excitation of the second machine when the switching means is open.

2. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, and regulating means including means responsive to the current in said closed circuit for controlling the field excitation of said second machine when said switching means is closed, said regulating means including means responsive to the differential voltage of said machines when said switching means is open, thereby controlling the excitation of said second machine.

3. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, and regulating means including means responsive to the current in said closed circuit for controlling the field excitation of said second machine when said switching means is closed, said regulating means including means responsive to the differential voltage across the contact members of said switching means for controlling the excitation of the second machine when the switching means is open to substantially match the voltages of said machines.

4. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, and regulating means including means responsive to the current in said closed circuit for controlling the field excitation of said second machine when said switching means is closed, said regulating means including means responsive to the differential voltage of said machines when said switching means is open, thereby controlling the excitation of said second machine to substantially match the voltage of said machines.

5. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, regulating means responsive to the current in said closed circuit for controlling the field excitation of said second machine when said switching means is closed, and control means associated with said switching means for establishing second regulating means responsive to the differential voltage of said machines when said switching means is open thereby controlling the excitation of the second machine to substantially match the voltages of said machines.

6. In a control system, in combination, a first dynamoelectric machine mechanically connected to a mass having kinetic energy, a second dynamoelectric machine normally operated at a substantially constant speed, switching means for connecting said machines in a closed loop circuit, and regulating means comprising means responsive to the current in said closed circuit for controlling the field excitation of said second machine when said switching means is closed, said regulating means comprising means responsive to the differential voltage across the contact members of said switching means when open for controlling the excitation of the second machine to substantially match the voltages of said machines thereby permitting said switching means to be reclosed while the first machine is rotating.

7. In a control system, in combination, a first dynamoelectric machine mechanically connected to a mass having kinetic energy, a second dynamoelectric machine normally operated at a substantially constant speed, switching means for connecting said machines in a closed loop circuit, and regulating means comprising means responsive to the current in said closed circuit for controlling the field excitation of said second machine when said switching means is closed, said regulating means comprising means responsive to the differential voltage of said machines when said switching means is opened thereby controlling the excitation of the second machine to substantially match the voltages of said machines and permit said switching means to be reclosed while the first machine is being driven by said mass.

8. In a control system, in combination, a first dynamoelectric machine mechanically connected to a mass having kinetic energy, a second dynamoelectric machine normally operated at a substantially constant speed, switching means for connecting said machines in a closed loop circuit, regulating means responsive to the current in said closed circuit for controlling the field excitation of said second machine when said switching means is closed, and control means associated with said switching means for establishing second regulating means responsive to the differential voltage of said machines when said switching means is opened, thereby controlling the excitation of the second machine to substantially match the voltages of said machines and permit the switching means to be reclosed while the first machine is rotating.

9. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, control means cooperating with the switching means to selectively obtain directional operation of the tension device, and regulating means comprising means responsive to the current in said closed circuit for controlling the field excitation of said second machine when said switching means is closed, said regulating means comprising means responsive to the differential voltage across the contact members of the switching means thereby controlling the excitation of the second machine when the switching means is open to substantially match the voltages of said machines.

10. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, control means cooperating with the switching means to selectively obtain directional operation of the tension device, and regulating means having an element responsive to the current in said closed circuit for controlling the field excitation of said second machine when said switching means is closed, said regulating means having another element responsive to the differential voltage of said machines when said switching means is opened thereby controlling the excitation of said second machine to substantially match the voltages of said machines.

11. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, control means cooperating with the switching means to selectively obtain directional operation of the tension device, and regulating means responsive to the current in said closed circuit for controlling the field excitation of said second machine when said switching means is closed, said control means cooperating with said switching means to establish second regulating means responsive to the differential voltage of said machines when said switching means is opened thereby controlling the excitation of the second machine to substantially match the voltages of said machines.

12. In a control system for a tension device for maintaining tension on a strip of material, in combination, a first dynamoelectric machine mechanically connected to the tension device, a second dynamoelectric machine normally operated at a substantially constant speed, switching means for connecting said machines in a closed loop circuit, regulating means having a current responsive element and a voltage responsive element, said current responsive element being energized by the current in said closed circuit to control the field excitation of said second machine when said switching means is closed thereby maintaining a predetermined tension on said strip, and said voltage responsive element being energized by the differential voltage of said machines when said switching means is open to control the field excitation of the second machine thereby substantially matching the voltages of said machines.

References Cited in the file of this patent

UNITED STATES PATENTS 2,305,937     Montgomery et al.  ------ Dec. 22, 1942